United States Patent [19]

Goerl et al.

[11] Patent Number: 5,216,055
[45] Date of Patent: Jun. 1, 1993

[54] HEAT VULCANIZABLE MOULDING MATERIALS

[75] Inventors: Udo Goerl, Meckenheim; Siegfried Wolff, Bornheim-Merten, both of Fed. Rep. of Germany

[73] Assignee: Degussa Aktiengesellschaft, Frankfurt am Main, Fed. Rep. of Germany

[21] Appl. No.: 811,530

[22] Filed: Dec. 20, 1991

[30] Foreign Application Priority Data

Jan. 7, 1991 [DE] Fed. Rep. of Germany ....... 4100218

[51] Int. Cl.$^5$ ................................................. C08K 5/54
[52] U.S. Cl. ................................... 524/188; 524/262; 524/436; 524/437
[58] Field of Search ................ 524/188, 436, 437, 262

[56] References Cited

U.S. PATENT DOCUMENTS

| | | | |
|---|---|---|---|
| 4,156,677 | 5/1979 | Williams et al. | 524/572 |
| 4,533,687 | 8/1985 | Itoh et al. | 524/436 |
| 4,560,719 | 12/1985 | Nakamura et al. | 524/436 |
| 4,704,414 | 11/1987 | Kerner | 523/213 |

FOREIGN PATENT DOCUMENTS

| | | | |
|---|---|---|---|
| 1227233 | 10/1966 | Fed. Rep. of Germany | 524/188 |
| 4004781 | 8/1991 | Fed. Rep. of Germany | |
| 2167345 | 7/1987 | Japan | 524/437 |

*Primary Examiner*—Paul R. Michl
*Assistant Examiner*—Olga Asinovsky
*Attorney, Agent, or Firm*—Beveridge, DeGrandi, Weilacher & Young

[57] ABSTRACT

Moulding materials are disclosed which are vulcanizable by means of the development of heat, and are provided with aluminum- and/or magnesium hydroxide in a flame-resistant manner and contain a thiocyantopropyltrialkoxy silane.

3 Claims, No Drawings

HEAT VULCANIZABLE MOULDING MATERIALS

BACKGROUND OF THE INVENTION

The present invention relates to moulding materials which can be vulcanized by means of the development of heat and which are provided with aluminum- and/or magnesium hydroxide to impart flame-resistance thereto. In another asepct, the present invention relates to a method of manufacture of these moulding materials.

Articles with flame-resistant properties are frequently manufactured in the rubber- and plastic-processing industry. This includes, among other items, flame-resistant cable jacket mixtures, conveyor belts and mixtures for use in the construction industry.

A measure of the flame-resistant properties of a mixture is represented by the LOI index (limit of oxygen index) according to ASTM 2863. The oxygen index contains the minimum concentration of xygen, expressed in percent by volume, in the mixture of oxygen and nitrogen at which the material being tested will burn the formation of flames under the conditions of the test method (ASTM 2863).

A mixture staisfies the requirements relating to flame retardation if the LOI index is over 30%.

In order to attain this numbe in the pst, flame-resistance imparting substances, namely, antimony trioxide, chloroparaffins and brominated compounds, were added to the polymer mixture. However, all these compounds are ver toxic and/or result, in the case of combustion, in very toxic decomposition products and can therefore no longer be used in view of current health and environmental regulations.

Therefore, additives such as aluminum- and magnesium hydroxide have increasingly provided themselves in recent years as non-toxic alternatives. Due to their high content of water of crystallization, which is liberated at temperature of >approximately 250° C., they exhibit an extinguishing action during the burning of a rubber article.

However, in order to attain flame-resistant vulcanizates which correspond to the standard, that is, an LOI index of >30%, with these substances, a dosing of these substances of 120 to 150 parts by weight relative to 100 parts by weight rubber or plastic is necessary.

These large quantities have the consequence that the mechanical properties of the polymer mixtures compounded with aluminum hydroxide or magnesium hydroxide are consideraby worsened, which means that certain performance spcieficiations regarding the vulcanizate properties of these articles which are also necessary along with the flame-retarding properties are no longer attained.

SUMMARY OF THE INVENTION

An object of the invention is to provide an agent which is suitable for improving the mechanical properties of the polymer mixtures filled with flame-retardant subsances based on aluminum- and magnesium hdyroxide in spite of the weight amounts which clearly exceed the amounts of filler generally used in plastics and rubbers.

In attaining the above and other objects, one feature of the invention resides in providing moulding materials that are vulcanizable by means of the action of heat and which are provided with aluminum- and/or magnesium hydroxide to obtain flame-resistance and which comprise one or more natural or synthetic rubbers or plastics which can be vulcanized either with sulfur or sulfur donors and accelerators or with peroxides, as well as fillers and other conventional components such as softeners, stabilizer, activators, pigments, anti-ageing agents, auxiliary processing agents and organosilicon compounds. The mounding materials of the invention are characterized in that they contain aluminum- and/or magnesium hydroxide in a total amount of 20 to 200 parts by weight per 100 parts by weight rubber or plastic and an organosilicon compound of the general formula (I)

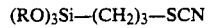

$(RO)_3Si-(CH_2)_3-SCN$ in which R represents an alkyl group with 1 to 8 carbon atoms.

These compounds are used especially in amounts of 0.1 to 10 parts by weight, preferably 0.5 to 3 parts by weight relative to 100 parts by weight of the polymer.

In order to attain the necessary flame protection, the mixtures are compounded with aluminum- and/or magnesium hydroxide also as a mixture in amounts of 20 to 200 parts by weight, preferably 100 to 500 parts by weight relative to 100 parts by weight rubber or plastic. Low amounts such as approximately 20 parts by weight are used especially if the entire amount of the flame-resistance imparting substances otherwise used is not replaced.

The inroganic hydroxides are mixed in either separately into the rubber or plastic mixture or together with the organosilicon compound.

Either a premixture or hydroxides reacted with the organosilicon compond can be used to this end.

Methods of manufacture are analogous to those used in connection with modified fillers and are described in EP patent 0,177,674 and in German application P 40 04 781.4, which are relied on and incorporated herein by reference.

If the compounds to be used in accordance with the invention are added to the mixture to be vulcanized in situ or also in modified form, this results in a lowering of the viscosity of the mixture and thus in a better workability.

DETAILED DESCRIPTION OF THE INVENTION

The vulcanizable moulding materials of the invention are produced according to the generally known methods.

The components are mixed—except for the peroxidic cross-linking agent and the accelerators—in any desired sequence until a homogenous mixture has been achieved.

After the addition of the peroxide and the accelerators and temperature is raised to where the vulcanization begins.

The traditional components, as they are generally used, include e.g. anti-ageing agents, softeners, auxiliary processing agents, stabilizers, pigments as well as other organosilicon compounds with a different structure.

It turned out that as regards the compression set values, the traring resistance and the modulus, the vulcanized moulding masses of the invention exhibit distinctly better values, as the following example shows.

Test standards for the evaulation:

|  | Test method | Units |
| --- | --- | --- |
| Mooney viscosity | DIN 53523/524 | ME |
| Tensile strength | DIN 53504 | MPa |
| Modulus 300% | DIN 53504 | MPa |
| Compression set | ASTM D 395 | % |

The following names and abbreviations, the meansing of which is listed here, are used in the example showing details of how the invention can be carried out:

| Keltan 578 | EPDM ot the DSM company |
| --- | --- |
| Elvax 260 | ethylene vinyl acetate (EVA) |
| Apyral 120 | aluminum hydroxide |
| Protector G 35 | antiozone wax |
| Vulkanox HS | 2,2,4-trimethyl-1,2-dihydroquinoline |
| TRIM | activator |
| Si 164 | 3-thiocyanatopropyltrimethoxy silane |
| Perkadox 14/40 | 1,3-bis-(tert.-butyl-peroxyl-isopropyl)-benzene |
| Struktol WB 16 | auxiliary processing agent |

EXAMPLE 1

Si 164 in a Flame-resistant Cable Jacket Mixture Based on EPDM/EVA

|  | 1 | 2 |
| --- | --- | --- |
| Keltan 578 | 70 | 70 |
| Elvax 260 | 30 | 30 |
| Apyral 120 | 120 | 120 |
| A 172 | 1 | 1 |
| Protector G 35 | 5 | 5 |
| Sunpar 2280 | 5 | 5 |
| Struktol WB 16 | 2.5 | 2.5 |
| Vulkanox HS | 1.5 | 1.5 |
| TRIM | 1 | 1 |
| Si 164 | — | 1.2 |
| Perkadox 14/10 | 5 | 5 |
| Mooney viscosity |  |  |
| ML 4 (100° C.) (ME) | 55 | 36 |
| Vulkanizate data: 180° C., t95% |  |  |
| Tensile strength (MPa) | 8.6 | 11.8 |
| Modulus 300% (MPa) | 6.2 | 10.9 |
| Shore hardness | 84 | 86 |
| Compression set B |  |  |
| 22 h/70° C. (%) | 42.6 | 29.4 |
| 70 h/100° C. (%) | 29.2 | 15.3 |

The use of Si 164 distinctly improves the tensile strength, modulus and compression set. The workability also becomes distinctly better.

Various rubbery polymers can be used in accordance with the present invention including natural rubber, SBR, butadiene rubber (BR), isoprene rubber, NBR and EPDM. Keotan 578 is a well know EPDM. In the foregoing examples any of the above identified rubbery plymers can be substituted to obtain comparable results.

Further variations and modifications of the foregoing will become apparent to those skilled in the art and are intended to be encompassed by the claims appended hereto.

German priority application No. P 41 00 218.0 is relied on and incorproated herein by reference.

We claim:

1. A moulding material vulcanizable by means of the action of heat, comprising at least one natural or synthetic rubber of polymer which can be vulcanized either with sulfur or sulfur donors and accelerators or with peroxides, and a filler including a flame-resistance imparting amount of aluminum- and/or magnesium hydroxide containing aluminum- and/or magnesium hydroxide in an amount of 20 to 200 parts by weight per 100 parts by weight rubber or polymer and an organo-silicon compound of the general formula (I)

$$(RO)_3SI-(CH_2)_3-SCN$$

in which R represents an alkyl group with 1 to 8 carbon atoms.

2. The moulding material according to claim 1, wherein the rubber is selected from the group consisting of natural rubber, SBR, BR, NBR, EPDM and isoprene rubber.

3. A method of manufacturing a moulding materials in accordance with claim 1, comprising mixing an organosilicon compound of formula (I)

$$(RO)_3SI-(CH_2)_3-SCN$$

wherein R is alkyl form 1 to 8 carbons, in the presence of an aluminum- and/or magnesium hydroxide, with a natural or synthetic rubber of polymer.

* * * * *